United States Patent
Hussein et al.

(10) Patent No.: US 9,688,823 B2
(45) Date of Patent: Jun. 27, 2017

(54) ALIPHATIC/SEMI-AROMATIC BLOCK COPOLYAMIDE

(71) Applicants: RHODIA OPERATIONS, Aubervilliers (FR); CNRS, Paris (FR)

(72) Inventors: Naji Hussein, Herry-Chekka (LB); Didier Long, Sainte Foy les Lyon (FR); Louise-Anne Fillot, Vaux-en-Velin (FR); Lise Trouillet-Fonti, Villette-de-Vienne (FR)

(73) Assignees: RHODIA OPERATIONS, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/442,457

(22) PCT Filed: Nov. 13, 2013

(86) PCT No.: PCT/EP2013/073702
§ 371 (c)(1),
(2) Date: May 13, 2015

(87) PCT Pub. No.: WO2014/076120
PCT Pub. Date: May 22, 2014

(65) Prior Publication Data
US 2016/0272767 A1    Sep. 22, 2016

(30) Foreign Application Priority Data

Nov. 14, 2012 (FR) ...................... 12 60834

(51) Int. Cl.
| | |
|---|---|
| C08G 81/00 | (2006.01) |
| C08J 3/20 | (2006.01) |
| C08G 69/26 | (2006.01) |
| C08G 69/28 | (2006.01) |
| C08L 77/06 | (2006.01) |

(52) U.S. Cl.
CPC .......... *C08G 81/00* (2013.01); *C08G 69/265* (2013.01); *C08G 69/28* (2013.01); *C08J 3/203* (2013.01); *C08L 77/06* (2013.01); *C08J 2377/00* (2013.01)

(58) Field of Classification Search
None
See application file for complete search history.

(56) References Cited

U.S. PATENT DOCUMENTS

| | | |
|---|---|---|
| 6,211,402 B1 | 4/2001 | Kleiner |
| 6,255,371 B1 | 7/2001 | Schlosser et al. |
| 6,344,158 B1 | 2/2002 | Schlosser et al. |
| 6,365,071 B1 | 4/2002 | Jenewein et al. |
| 2003/0171494 A1 | 9/2003 | Aramaki et al. |

FOREIGN PATENT DOCUMENTS

EP    0615997 A1    9/1994

OTHER PUBLICATIONS

Eersels et al.—Transamidation in Melt-Mixed Aliphatic and Aromatic Polyamides. 3. Molecular Characterization Using Gradient Elution Chromatography (GEC) (1996) Macromolecules 29, pp. 6744-6749 (6 pages).

*Primary Examiner* — Ana Woodward

(57) ABSTRACT

The invention relates to a method for the melted production, especially by reactive extrusion, of block copolyamide comprising at least one aliphatic polyamide block and at least one semi-aromatic block, especially wherein the aromatic group has at least one hydroxyl or sulfonate function. The invention also relates to the block copolyamide that can be produced by said method; to a composition comprising the block copolyamide; to granules comprising such a copolyamide or such a composition; to a method for producing an item from a copolyamide or a composition of said copolyamide; and to uses of the copolyamide.

17 Claims, No Drawings

ALIPHATIC/SEMI-AROMATIC BLOCK COPOLYAMIDE

This application is a U.S. national phase entry under 35 U.S.C. §371 of International Application No. PCT/EP2013/073702, filed on Nov. 13, 2013, which claims priority to French Application No. 12 60834, filed on Nov. 14, 2012. The entire contents of these applications are being incorporated herein by reference for all purposes.

The present invention relates to a process for the melt preparation, especially by reactive extrusion, of a block copolyamide comprising at least one aliphatic polyamide block and at least one semi-aromatic block, in particular in which the aromatic group bears at least one hydroxyl or sulfonate function, and to the block copolyamide obtained.

Thermoplastic polymers are starting materials that are capable of being transformed by molding, injection-molding, injection blow-molding, extrusion, extrusion/blow-molding or spinning, especially into a plurality of articles such as blown, extruded or molded pieces, for example for bodywork, yarns, fibers or films, etc.

There are in particular two major constraints in all these approaches for transforming thermoplastic polymer.

The first of these constraints is that the thermoplastic polymers used must be characterized, in the melt, by a viscosity or rheological behavior that is compatible with the abovementioned forming processes. These thermoplastic polymers must be sufficiently fluid when they are molten, to be able to be conveyed and manipulated easily and quickly in certain forming machines.

The other constraint that emburdens thermoplastic polymer compositions is linked to the mechanical qualities that they must have after having been melted, formed and hardened by cooling. These mechanical qualities are especially the thermomechanical properties. Among thermoplastic polymers, polyamides are polymers of great industrial and commercial interest. However, it is always desirable to improve their mechanical and in particular thermomechanical properties.

In addition, technical polyamides are used for the preparation of numerous articles in various fields, such as the motor vehicle field, where specific properties of stiffness, impact strength, dimensional stability, in particular at relatively high temperatures, surface appearance, density and weight are particularly desired. The choice of a material for a given application is generally guided by the level of performance required with regard to certain properties and by its cost. In fact, a search is always under way for novel materials capable of meeting requirements in terms of performance and/or costs.

For example, polyamide materials are used for manufacturing monolayer or multilayer articles for containing or transporting a fluid, for instance tubes, pipes, tanks or films. However, these materials may have insufficient gas-barrier or liquid-barrier properties, and may especially have an unsatisfactory compromise with other properties such as those mentioned above.

The (co-)polymers described in the prior art may especially prove to be unsatisfactory in terms of physical and/or thermomechanical properties, and in particular in terms of permeability to fluids, especially to ethanol, of fatigue strength and/or of impact strength.

The present invention is thus directed toward proposing polyamides for solving all or some of the problems mentioned above, and especially toward proposing polyamides that have improved properties, especially in terms of viscosity, flexibility and ease of forming, cost, barrier properties, especially to fluids, and in particular to ethanol, fatigue strength and/or impact strength.

Moreover, the prior art does not describe a process for obtaining block copolyamides of this type. In particular, in the case of polyamides incorporating monomers bearing alcohol or sulfonate functions on an aromatic group, the prior art discloses only the production of statistical copolyamides.

Thus, the invention is directed toward proposing a process for obtaining block copolyamides that is easy to perform, that is polyvalent, and/or that allows the production of these copolyamides under conditions that are compatible with industrial processes.

According to a first aspect, a subject of the invention is a process for the melt preparation of a copolyamide comprising at least one aliphatic block and at least one semi-aromatic block, said process comprising at least the following steps:

mixing at least one aliphatic polyamide and at least one semi-aromatic polyamide, said polyamides being terminated with functions that are capable of reacting together, heating the mixture so that the polyamides are molten and the polycondensation reaction can take place between the polyamides, recovering the copolyamide comprising at least one aliphatic block and at least one semi-aromatic block.

For the purposes of the present invention, the term "block copolyamide" means that the copolyamide is not statistical, but comprises, or even consists of, blocks with a mean size of at least 3 repeating units and especially at least 4 repeating units. The mean length of each type of block, aliphatic or semi-aromatic, may in particular be as defined below in the description.

According to a second aspect, a subject of the invention is a block copolyamide that may be obtained via the process as described in the present description.

According to a third aspect, a subject of the invention is a block copolyamide comprising:

at least one aliphatic, in particular semi-crystalline, polyamide block, and at least one semi-aromatic, especially semi-crystalline or amorphous, polyamide block.

Most particularly, the copolyamide is linear.

According to a fourth aspect, a subject of the invention is a composition comprising a block copolyamide as defined in the present description.

The present invention relates to a process for preparing a copolyamide comprising at least one aliphatic block and at least one semi-aromatic block, said process comprising at least the following steps:

mixing at least one aliphatic polyamide and at least one semi-aromatic polyamide, heating the mixture so that the polyamides are molten and the polycondensation reaction can take place between the polyamides, recovering the copolyamide comprising at least one aliphatic block and at least one semi-aromatic block.

During the polycondensation step, exchange reactions such as amidolysis, acidolysis and aminolysis may take place. These reactions may lead to hydrolysis of the block copolyamides and finally lead to statistical copolymers. It is thus desirable to limit these reactions, especially by means of rapid reaction times and limited reaction durations.

The temperature at which the polycondensation reaction is performed is above the highest melting point of the polyamides present, or Thm, i.e. of those intended to condense to form the copolymer.

The temperature at which this step is performed may in particular range from the highest melting point to the highest melting point plus 80° C., especially from Thm+20° C. to Thm+80° C. and in particular from Thm+25° C. to Thm+50° C.

Most particularly, the polycondensation step is performed over a relatively short time. In particular, this step may last less than 30 minutes, especially less than 20 minutes, or even less than 10 minutes, and most particularly less than 6 minutes. Moreover, this step may last at least 2 minutes and especially at least 2.5 minutes. This polycondensation step may thus be performed over a time period ranging from 2 to 10 minutes and in particular from 2.5 to 6 minutes.

The mixture may also comprise a polycondensation catalyst especially such as phosphorus-based catalysts. This catalyst may especially be chosen from phosphorous acid, phosphoric acid and sodium hypophosphite, in particular sodium hypophosphite. This catalyst may be present in a content ranging from 50 to 200 ppm and especially from 70 to 120 ppm by weight relative to the total weight of the starting aliphatic and semi-aromatic polyamides.

Most particularly, the polycondensation step is performed in the melt, i.e. at a temperature greater than or equal to the highest melting point of the polyamides that it is desired to co-polycondensate. Most particularly, this step is performed by reactive extrusion. This may especially make it possible to prepare block copolymers and to limit the hydrolysis reactions, and thus to limit the bond cleavages/formation that lead finally to a statistical polymer.

The aliphatic and semi-aromatic polyamide chains are terminated with functions that are capable of reacting together, especially acid and amine functions. The terminal acid functions may also be, totally or partly, in an "activated" form, such as acyl chloride or anhydride. The terminal amine functions are in particular primary amines.

The aliphatic polyamide may comprise, or even consist of, repeating units originating from diamines, diacids and/or amino acids, in particular the repeating units are diacids and diamines, and most particularly a diacid/diamine couple.

The aliphatic diamines may be of the type $H_2N-R_1-NH_2$ in which $R_1$ is an aliphatic radical comprising at least 2 carbon atoms, in particular at least 4 carbon atoms and most particularly at least 6 carbon atoms. $R_1$ may also comprise not more than 12 carbon atoms. The two amine functions may be separated by at least 6 carbon atoms, or even at least 6 carbon atoms. The aliphatic diamines may be linear aliphatic diamines, such as 1,10-diaminodecane; branched aliphatic diamines, such as 2-methyl-1,6-diaminohexane; or cyclic aliphatic diamines, such as di(aminomethyl)cyclohexanediamines.

The aliphatic diamines may be chosen especially from hexamethylenediamine, butanediamine, 2-methylpentamethylenediamine, 2-methylhexamethylenediamine, 3-methylhexamethylenediamine, 2,5-dimethylhexamethylenediamine, 2,2-dimethylpentamethylenediamine, nonanediamine, 5-methylnonanediamine, dodecamethylenediamine, 2,2,4-trimethylhexamethylenediamine and/or 2,4,4-trimethylhexamethylenediamine, 2,2,7,7-tetramethyloctamethylenediamine, isophoronediamine and diaminodicyclomethane. Most particularly, the aliphatic diamine is hexamethylenediamine.

The aliphatic diacids may be of the type $HOOC-R_2-COOH$ in which $R_2$ is an aliphatic radical comprising at least 2 carbon atoms, in particular at least 4 carbon atoms and most particularly at least 6 carbon atoms. $R_2$ may also comprise not more than 12 carbon atoms. The two acid functions may be separated by at least 6 carbon atoms, or even at least 6 carbon atoms. The aliphatic radical may be linear, branched or cyclic.

The aliphatic diacids may be chosen from glutaric acid, adipic acid, suberic acid, sebacic acid, dodecanedioic acid, 1,2-cyclohexanedicarboxylic acid, 1,3-cyclohexanedicarboxylic acid, 1,2-cyclohexanediacetic acid and 1,3-cyclohexanediacetic acid. In particular, it is adipic acid.

When the aliphatic polyamide comprises, or even consists of, repeating units derived from aliphatic amino acids, they may be of the type $H_2N-R_3-COOH$ in which $R_3$ is an aliphatic radical comprising at least 2 carbon atoms, in particular at least 4 carbon atoms and most particularly at least 6 carbon atoms. $R_3$ may also comprise not more than 18 carbon atoms, especially not more than 12 carbon atoms. The aliphatic radical may be linear, branched or cyclic. In particular, the amino acids or the lactams may be chosen from caprolactam, aminoundecanoic acid and lauryllactam, and mixtures thereof.

In the case where the aliphatic polyamide originates from amino acids or lactams, it is advantageous to bring about a GTA/GTC disequilibrium, especially by reaction with chain blockers, for example monoamines to block the acid functions or monoacids to block the amine functions.

In the case where the aliphatic polyamide comprises diamines and diacids, it is also advantageous to bring about a GTA/GTC disequilibrium, especially with an excess of diamine or of diacids, and/or by addition of chain blockers.

The aliphatic polyamide may comprise at least one polyamide chosen from the following polyamides: PA6, PA11, PA12, PA46, PA66, PA610, PA612, PA106, PA1010, PA1012, PA126, PA1210 and PA1212, and most particularly from PA6, PA11, PA12, PA66, PA610, PA612, PA106, PA1010, PA1012, PA126, PA1210 and PA1212.

According to a particular embodiment, the aliphatic polyamide may consist of a single amino acid and/or of a single diamine-diacid couple. Most particularly, the aliphatic polyamide is composed of hexamethylenediamine and of adipic acid, i.e. PA66.

According to another embodiment, the polyamide comprises at least two amino acids and/or at least two diamine-diacid couples, i.e. at least two diacids and one diamine or one diacid and two diamines.

In particular, the polyamides used in this process are stable up to at least 350° C., in particular measured by thermogravimetric analysis, TGA.

The aliphatic polyamides may have a weight-average molecular mass Mw of greater than or equal to 20 000. They may have a weight-average molecular mass ranging from 10 000 to 50 000 g/mol and especially ranging from 20 000 to 40 000 g/mol.

Advantageously, the aliphatic polyamide is semi-crystalline. It may then have:
 a degree of crystallinity, or Xc, of at least 25%, especially ranging from 30% to 40%,
 a glass transition temperature, or Tg, of greater than or equal to 60° C., and/or
 a melting point, or Tm, of greater than or equal to 250° C., especially ranging from 250 to 300° C.

The semi-aromatic polyamide may comprise, or even consist of, repeating units originating from diamines, diacids and/or amino acids, in particular the repeating units are diacids and diamines, and most particularly a diacid/diamine couple.

The diamine may be aliphatic and the diacid aromatic, or the diamine may be aliphatic and the diacid aromatic.

The aliphatic diacids and aliphatic diamines may be as defined above in the context of the aliphatic polyamide block.

The aromatic diacids may especially comprise at least 8 carbon atoms, and optionally one or more heteroatoms, especially functions of the alcohol and/or sulfonate type. Among the diacids, mention may be made of terephthalic acid, isophthalic acid, 2-hydroxyterephthalic acid, 5-hydroxyisophthalic acid, 4-hydroxyisophthalic acid, 2,5-dihydroxyterephthalic acid, sodium 5-sulfoisophthalic acid or NaISA, lithium 5-sulfoisophthalic acid or LiISA, and potassium 5-sulfoisophthalic acid or KISA.

The aromatic diamines may especially comprise at least 8 carbon atoms, and optionally one or more heteroatoms, especially functions of the alcohol and/or sulfonate type. Among the aromatic diamines, mention may be made of m-xylylenediamine or MXD, and 5-hydroxy-m-xylylenediamine.

In the case where the semi-aromatic polyamide comprises an aromatic diacid:
the diacid may be chosen from terephthalic acid, isophthalic acid, 2-hydroxyterephthalic acid, 5-hydroxyisophthalic acid, 4-hydroxyisophthalic acid and 2,5-dihydroxyterephthalic acid, and/or
the diamine may be chosen from hexamethylenediamine, butanediamine, 2-methylpentamethylenediamine, 2-methylhexamethylenediamine, 3-methylhexamethylenediamine, 2,5-dimethylhexamethylenediamine, 2,2-dimethylpentamethylenediamine, nonanediamine, 5-methylnonanediamine, dodecamethylenediamine, 2,2,4-trimethylhexamethylenediamine and/or 2,4,4-trimethylhexamethylenediamine, 2,2,7,7-tetramethyloctamethylenediamine, isophoronediamine and diaminodicyclohexylmethane.

In particular, the polyamide comprise as diacid only aromatic diacids, and in particular an aromatic diacid, most particularly combined with only one diamine.

In the case where the semi-aromatic polyamide comprises an aromatic diamine:
the diacid may be chosen from glutaric acid, adipic acid, suberic acid, sebacic acid, dodecanedioic acid, 1,2- or 1,3-cyclohexanedicarboxylic acid and 1,2- or 1,3-cyclohexanediacetic acid, and/or
the diamine may be chosen from m-xylylenediamine, or MXD, and 5-hydroxy-m-xylylenediamine.

In particular, the polyamide comprise as diamine only aromatic diamines, and in particular an aromatic diamine, most particularly combined with only one diacid.

Most particularly, the semi-aromatic polyamide is semi-crystalline. In this case, it may be an MXD6 or PA6T block or a hexamethylene diamine and terephthalic acid polyamide.

The semi-crystalline semi-aromatic polyamides may have a weight-average molecular mass of greater than or equal to 10 000 g/mol and in particular ranging from 10 000 to 35 000 g/mol.

The semi-crystalline semi-aromatic polyamide may have:
a degree of crystallinity of at least 10%, especially ranging from 10% to 30%,
a Tg of greater than or equal to 60° C., especially greater than 100° C. and in particular ranging from 100 to 170° C., and/or
a Tm of greater than or equal to 250° C., especially ranging from 250 to 300° C.

According to one particular embodiment, the semi-aromatic polyamide is amorphous. In this case, it may be PA6HIA, i.e. a hexamethylenediamine 5-hydroxyisophthalic acid polyamide, PA6I, i.e. a hexamethylenediamine isophthalic acid polyamide, or PANDT/INDT, i.e. a 2,2,4/2,4,4-trimethylhexamethylenediamine terephthalic acid polyamide. In the case where the semi-aromatic polyamide is amorphous, it may have a Tg of greater than or equal to 100° C., and especially ranging from 100 to 170° C.

In the case where the semi-aromatic polyamide is amorphous, the weight-average mass, Mw, of that in the copolyamide may be less than or equal to 15 000 g/mol, or even 13 000 g/mol.

The content of semi-aromatic polyamides may be less than or equal to 25% by weight and especially less than or equal to 20% by weight relative to the total weight of polyamide. It may be greater than or equal to 5% by weight and especially greater than or equal to 8% by weight relative to the total weight of the copolyamide.

Most particularly, when the aliphatic polyamides have a GTC>GTA, the semi-aromatic polyamides have a GTA>GTC, and vice versa. This may especially make it possible to improve the co-polycondensation between these polyamides. The use of amine-terminated aliphatic polyamides with acid-terminated semi-aromatic polyamides, or vice versa, may make it possible to increase the coupling reactions and to reduce the exchange reactions.

In particular, the aliphatic polyamide has a |GTA−GTC| of greater than or equal to 150 meq./kg, especially greater than or equal to 180 meq./kg, in particular greater than or equal to 220 meq./kg, most particularly greater than or equal to 260 meq./kg, even more particularly greater than or equal to 300 meq./kg, or even greater than or equal to 320 meq./kg.

In particular, the semi-aromatic polyamide has a |GTA−GTC| of greater than or equal to 40 meq./kg, especially greater than or equal to 50 meq./kg, in particular greater than or equal to 60 meq./kg, most particularly greater than or equal to 60 meq./kg, even more particularly greater than or equal to 65 meq./kg, or even greater than or equal to 70 meq./kg.

The GTA and GTC represent the concentration of the amine and carboxylic acid end groups per kg of polyamide. They are determined by dissolution of polyamide in TFE/CHCl$_3$, and the amine functions are then measured by potentiometric assay with HCl, while the carboxylic functions are assayed by back-titration after addition of the base TBOH.

In the cases where the polyamide is insoluble in the solvent permitting this measurement, the GTA and GTC are measured by NMR. Such a method is defined in the examples.

The polyamides used may have a limited water content, especially less than 1000 ppm, in particular less than 500 ppm, measured by the Karl Fischer titration method. In particular, the measurements are performed on dry polyamides, i.e. polyamides with a water content of less than 500 ppm.

The process may comprise a step of extrusion of the copolyamide, in particular in the form of granules.

The process may also comprise a cooling step, especially after extrusion of the copolyamide.

According to a particular embodiment, the process comprises:
a polycondensation step for a time ranging from 2 to 10 minutes,
a polycondensation catalyst, especially phosphorous acid, phosphoric acid or sodium hypophosphite,
an aliphatic polyamide, in particular as defined above, with a |GTA−GTC| of greater than or equal to 150 meq./kg, a semi-aromatic polyamide, in particular as defined above, with a |GTA−GTC| of greater than or equal to 40 meq./kg, and/or for obtaining a block copolyamide as defined below.

The block copolyamide is semi-crystalline. In particular, in the case where it comprises one or more amorphous semi-aromatic blocks, the copolyamide may have a degree of crystallinity of greater than or equal to 20%. In general, this degree of crystallinity may range from 20% to 50%. Most particularly, in the case where the semi-aromatic polyamide is amorphous, the copolyamide has a crystallinity of at least 90%, especially of at least 95%, or even of at least 98%, relative to that of the semi-crystalline aliphatic polyamide. For example, in the case of an aliphatic polyamide of PA66 type (whose Xc is 33%), the crystallinity of the copolyamide may be greater than or equal to 29.7, especially to 31.35, or even to 32.34.

Moreover, it may have the crystalline structure of the copolyamide and may be of the same type as that of the semi-crystalline aliphatic polyamide. For example, in the case where the aliphatic polyamide is PA66, the copolyamide may have spherulite and lamellar structures.

Most particularly, the block copolymer is linear.

The block copolyamide may comprise solely repeating units of polyamide type. The blocks present in the block copolyamide are in particular as obtained via the process defined above.

Consequently, the nature of the monomers of these blocks corresponds to the definition of the monomers of the aliphatic and semi-aromatic polyamides used in the process according to the invention, in particular as defined above.

The copolyamide comprises at least one aliphatic polyamide block. It may comprise at least two, especially at least three, in particular at least four, or even at least five aliphatic polyamide blocks. These blocks may be identical or different. Advantageously, all the aliphatic polyamide blocks are identical, i.e. they comprise the same repeating units.

The aliphatic polyamide blocks may comprise, on average, at least 8 repeating units, in particular at least 14 repeating units, most particularly at least 18 repeating units, or even at least 20 repeating units, most particularly at least 30 repeating units, or even at least 40 repeating units. The number of repeating units may be measured by NMR, as described in the examples.

The aliphatic polyamide blocks may thus each have a weight-average molar mass, Mw, of greater than or equal to 1800 g/mol, especially greater than or equal to 3100 g/mol, in particular greater than or equal to 4500 g/mol, or even greater than or equal to 7500 g/mol.

The copolyamide according to the invention comprises at least one semi-aromatic polyamide block. It may comprise at least two, especially at least three, in particular at least four, or even at least five aliphatic polyamide blocks. These blocks may be identical or different. Advantageously, all the semi-aromatic polyamide blocks are identical, i.e. they comprise the same repeating units.

In particular, in the case where the semi-aromatic polyamide block is amorphous, it may have a weight-average molar mass, Mw, of less than or equal to 7000 g/mol, especially less than or equal to 5000 g/mol. In particular, it may have a weight-average molar mass ranging from 3000 to 6500 g/mol, or even from 3500 to 5000 g/mol.

The semi-aromatic polyamide blocks, in particular amorphous semi-aromatic polyamide blocks, may have a mean size of greater than or equal to 3 repeating units, especially greater than or equal to 4 repeating units. They may also have a mean size of less than or equal to 10 repeating units.

In the case where the semi-aromatic polyamide block is semi-crystalline, its weight-average molar mass, Mw, may range from 3500 to 15 000 g/mol.

In particular, the copolyamide comprises monomers bearing at least one function chosen from alcohol and sulfonate, especially as defined above. These monomers may in particular be aromatic monomers, most particularly as defined above, and even more particularly of HIA or AISLi type.

The copolyamide may comprise a content of semi-aromatic block(s), in particular when the semi-aromatic block is amorphous, of less than or equal to 25% by weight and especially less than or equal to 20% by weight relative to the total weight of the copolymer. The content of semi-aromatic blocks may be greater than or equal to 5% by weight and especially greater than or equal to 8% by weight relative to the total weight of the copolyamide.

The copolyamide may have a weight-average molecular mass, Mw, of greater than 40 000 g/mol, especially greater than or equal to 65 000 g/mol, in particular greater than or equal to 65 000 g/mol. In particular, the weight-average molecular mass may range from 70 000 to 120 000 g/mol.

The linear polyamides have pseudo-plastic behavior, i.e. their viscosity η (eta), measured at 280° C., as a function of the shear rate, shows a Newtonian plateau at low shear ($<200$ s$^{-1}$) and then a decrease in viscosity as the shear rate increases.

The copolymers according to the invention, in particular PA66/6HIA, have a viscosity η at a low shear rate ($<200$ s$^{-1}$) of about 10 times higher than that of PA66. On the other hand, when the shear rate increases, the difference in viscosity η between the copolymer and the corresponding linear aliphatic PA, especially PA66, decreases. For example, in the case of PA66/6HIA, the viscosity η at 3000 s$^{-1}$ is only from 1.5 to 3 times greater than that of PA66.

Thus, the copolymers according to the invention are very advantageous from an implementation viewpoint since they have a shear-dependent difference in viscosity that is even more pronounced than that of the standard polyamides, in particular than PA66. This allows easy implementation in processes as varied as injection molding and extrusion blow-molding.

According to one of its aspects, a subject of the invention is the use of a block copolymer according to the invention as:

- an agent for increasing the difference in viscosity η of a polymer composition, in particular a polyamide, as a function of the shear rates, in particular relative to PA66, most particularly measured in the manner defined in the examples,
- an agent for improving the impact strength of a polymer composition, and in particular a polyamide, said impact possibly being the Charpy impact, most particularly measured in the manner defined in the examples,
- an agent for improving the impermeability of a polymer composition, and in particular a polyamide, said impermeability possibly being the impermeability to ethanol, most particularly measured in the manner defined in the examples, and/or
- an agent for improving the fatigue life of a polymer composition, and in particular a polyamide, said fatigue life possibly being measured in the manner defined in the examples.

The invention also relates to the composition comprising a block copolyamide, this composition possibly being especially in the form of granules.

According to one variant, the composition comprises as polymer, and especially as polyamide, only one or more block copolyamide(s) according to the invention.

According to another variant, the composition comprises as polymer one or more block copolyamide(s) according to the invention, and at least one other thermoplastic polymer, in particular at least one aliphatic and/or semi-aromatic polyamide, especially as defined above, and more particularly of PA6 and/or PA66 type.

Most particularly, the composition comprises as polymer only a block copolyamide according to the invention and at least one aliphatic and/or semi-aromatic polyamide, especially as defined above, and more particularly of PA6 and/or PA66 type.

The block copolyamide according to the invention may be present in the composition in a content ranging from 2% to 90% by weight, especially from 5% to 50% by weight, or even from 10% to 30% by weight, relative to the total weight of polymers present in the composition.

The block copolyamide according to the invention may be present in the composition in a content ranging from 2% to 99% by weight, especially from 5% to 40% by weight, or even from 10% to 25% by weight, relative to the total weight of polyamides present in the composition.

The composition according to the invention may comprise reinforcing and/or bulking fillers, for instance fibrous fillers and/or non-fibrous fillers.

Mention may be made, as fibrous fillers, of glass fibers, carbon fibers, natural fibers, aramid fibers and nanotubes, in particular carbon nanotubes. Mention may be made, as natural fibers, of hemp and flax. Mention may in particular be made, among non-fibrous fillers, of all particulate or lamellar fillers and/or exfoliable or non-exfoliable nanofillers, such as alumina, carbon black, aluminosilicate clays, montmorillonites, zirconium phosphate, kaolin, calcium carbonate, diatomaceous earths, graphite, mica, silica, titanium dioxide, zeolites, talc, wollastonite, polymeric fillers, such as, for example, dimethacrylate particles, glass beads or glass powder.

It is possible for the composition to comprise several types of reinforcing fillers. Preferentially, the most widely used filler may be glass fibers, of the "chopped" type, especially having a diameter of between 7 and 14 µm. These fillers may have surface sizing, ensuring mechanical adhesion between the fibers and the polyamide matrix.

The weight concentration of the reinforcing or bulking fillers may range from 1% to 60% by weight relative to the total weight of the composition and especially from 15% to 50% by weight relative to the total weight of the composition.

The composition may comprise flame retardants of any type, i.e. compounds for reducing flame propagation and/or having flame-retardant properties, which are well known to those skilled in the art. These flame retardants are normally used in flame-retardant compositions and are especially described, for example, in U.S. Pat. Nos. 6,344,158, 6,365,071, 6,211,402 and 6,255,371, cited herein by way of reference. Advantageously, the flame-retardant system comprises at least one flame retardant chosen from the group comprising:

flame retardants containing phosphorus, such as:
  phosphine oxides, for instance triphenylphosphine oxide, tris(3-hydroxypropyl)phosphine oxide and tris(3-hydroxy-2-methylpropyl)phosphine oxide.
  phosphonic acids or salts thereof or phosphinic acids or salts thereof, for instance zinc, magnesium, calcium, aluminum or manganese salts of phosphinic acids, in particular the aluminum salt of diethylphosphinic acid or the zinc salt of dimethylphosphinic acid,
  cyclic phosphonates, such as cyclic diphosphate esters, for instance Antiblaze 1045,
  organic phosphates, such as triphenyl phosphate,
  mineral phosphates, such as ammonium polyphosphates and sodium polyphosphates,
  red phosphorus, whether in stabilized form or coated form, as a powder, or in the form of masterbatches, for example,
flame retardants of organonitrogen compound type, for instance triazines, cyanuric acid and/or isocyanuric acid, melamine or derivatives thereof, such as melamine cyanurate, melamine oxalate, phthalate, borate, sulfate, phosphate, polyphosphate and/or pyrophosphate, condensed melamine products, such as melem, melam and melon, tri(hydroxyethyl) isocyanurate, benzoguanamine, guanidine, allantoin and glycoluril,
flame retardants containing halogenated derivatives, such as
  bromine derivatives, for instance PBDPOs (polybromodiphenyl oxides), BrPS (brominated polystyrene and polybromostyrene), poly(pentabromobenzyl acrylate), brominated indane, tetradecabromodiphenoxybenzene (Saytex 120), 1,2-bis(pentabromophenyl)ethane or Saytex 8010 from Albemarle, tetrabromobisphenol A and brominated epoxy oligomers. Mention may especially be made, among brominated derivatives, of polydibromostyrene, such as PDBS-80 from Chemtura, brominated polystyrenes, such as Saytex HP 3010 from Albemarle or FR-803P from Dead Sea Bromine Group, decabromodiphenyl ether (DBPE) or FR-1210 from Dead Sea Bromine Group, octabromodiphenyl ether (OBPE), 2,4,6-tris(2,4,6-tribromophenoxy)-1,3,5-triazine or FR-245 from Dead Sea Bromine Group, poly(pentabromobenzyl acrylate) or FR-1025 from Dead Sea Bromine Group, and epoxy-terminated oligomers or polymers of tetrabromobisphenol A, such as F-2300 and F-2400 from Dead Sea Bromine Group,
  chlorinated compounds, for instance a chlorinated cycloaliphatic compound, such as Dechlorane Plus® (sold by OxyChem, see CAS 13560-89-9).

These compounds may be used alone or in combination, sometimes synergistically. Preference is given in particular to a synergistic combination of phosphorus compounds, such as phosphine oxides, phosphonic acids or salts thereof or phosphinic acids or salts thereof, and cyclic phosphonates, with nitrogen derivatives, such as melam, melem, melamine phosphate, melamine polyphosphates, melamine pyrophosphates or ammonium polyphosphates. Use may be made especially, as synergists, of antimony compounds, metal oxides and zinc borate.

The composition may comprise from 5% to 40% by weight of flame retardants, relative to the total weight of the composition.

The composition according to the invention may also comprise fillers and/or additives conventionally used in the manufacture of polyamide compositions. Thus, mention may be made of lubricants, plasticizers, nucleating agents, impact modifiers, catalysts, light and/or heat stabilizers, antioxidants, antistatic agents, dyes, mattifying agents, molding aids or other conventional additives.

In particular, it is possible to add to the polyamide composition, agents that modify the impact strength. It is generally elastomeric polymers that may be used for this purpose. The toughness modifiers are generally defined as having an ASTM D-638 tensile modulus of less than about 500 MPa. Examples of suitable elastomers are ethylene/acrylic ester/maleic anhydride products, ethylene/propylene/maleic anhydride products or ethylene/propylene/diene monomer products (EPDMs) optionally with a grafted maleic anhydride. The weight concentration of elastomer is advantageously between 0.1% and 30% relative to the total weight of the composition.

Preference is given especially to impact modifiers comprising functional groups that are reactive with the polyamide. Mention may be made, for example, of terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene-maleimide copolymers grafted with maleic anhydride, styrene-ethylene-butylene-styrene copolymers modified with maleic anhydride, styrene-acrylonitrile copolymers grafted with maleic anhydride, acrylonitrile-butadiene-styrene copolymers grafted with maleic anhydride, and the hydrogenated versions thereof. The weight proportion of these modifiers in the total composition is especially between 0.1% and 40%.

These fillers and additives may be added to the modified polyamide via normal means suited to each filler or additive. The materials and compositions of the invention are generally obtained by blending the various constituents under hot conditions, for example in a single- or twin-screw extruder, at a temperature sufficient to keep the polyamide resin as a molten medium, or under cold conditions, in a mechanical mixer in particular.

Generally, the blend obtained is extruded in the form of rods which are cut into pieces in order to form granules. The compounds may be added at any point in the process for the manufacture of the plastic, especially by hot or cold blending with the plastic matrix. The addition of the compounds and additives may be performed by adding these compounds to the molten plastic matrix in pure form or in the form of a concentrated mixture in a matrix, for instance a plastic matrix.

The composition is preferentially a composition to be molded, for example in the form of granules or powder, serving especially for the manufacture of articles via an injection molding process. The composition according to the invention may be used in any process for forming plastics, for instance molding processes, especially injection molding, rotational molding, sintering or casting, or extrusion processes, such as extrusion blow molding and film-forming. The invention thus also relates to processes for manufacturing molded or extruded articles by forming a composition of the invention.

Moreover, the copolyamide composition used in the process for manufacturing articles is advantageously dried before forming, especially so as to have a water content of less than or equal to 1000 ppm, in particular 500 ppm.

A subject of the invention is thus also a process for manufacturing an article, comprising the forming of the composition, in particular by molding, especially injection molding, rotational molding, sintering or casting, or by extrusion such as extrusion blow molding and film-forming. The composition is in particular in the form of granules.

This process may comprise a step of post-treatment of the article, especially of drying for 12 hours at 110° C. under vacuum, followed by slow cooling, especially by allowing it to return to room temperature. This may in particular be performed in the case of articles intended for measuring.

The examples that follow are given as illustrations of the invention.

EXAMPLES

Example 1

Copolyamide 90/10 PA66/6HIA

The characteristics presented below were measured via the following techniques:
DSC: Tc, ΔHc, Tm, ΔHm, $Xc_{[PA66]}$ The thermal properties (melting point and crystallization point, Xc) were determined in standard DSC using a TA Q2000 calorimeter. Samples taken from granules or specimens (8 mg) are placed in a non-hermetic capsule under a stream of nitrogen, and then flushed at a temperature from 25° C. up to 290° C. at a temperature ramp of 10° C./minute to measure the Tm. After melting, a cooling ramp from 290° C. to 25° C. was applied to determine the Tc.
GPC: Mn, Mw, Mz The sample taken from a specimen or a granule (a few mg) is dissolved in a dichloromethane/trifluoroacetic anhydride mixture (95:5 v/v DCM/TFAA). After stirring for 4 hours at room temperature, the solution is filtered through a 0.2 μm filter and then injected into the column of the PL GPC 120 machine (four 60 cm PLGEL MIXTE C columns with 5 μm particles). The elution flow rate is set at 1 ml/minute. Detection at the column outlet was performed with a refractometer and a UV2000 spectrum detector.
NMR: Mean Chain Length ($L_{PA66}$ and $LPA_{6HIA}$)

The $^{13}C$ NMR analyses were performed on a Brüker AV500 spectrometer at 300 K using deuterated hexafluoroisopropanol as solvent. The $^{13}C$ spectrum was recorded with the following parameters: Frequency of 125.76 MHz, sweep width 261.5 ppm and acquisition time of 2 seconds, pulse width 9 μs and a delay of 3 for 8200 accumulations.

The block length analyses were determined from the area of the peak corresponding to the carbon of the amine in the alpha position of the amide function. (BB and BA) denotes the two carbons of the diamine connected to the aliphatic diacid, and (AA and AB) denotes those of the diamine connected to the aromatic diacid.

The mean length of each block is calculated according to the following formula:

$$L_{PA66} = 1/P_{BA} = ([BB]/[BA]) + 1 = (I_{BB}/2I_{BA}) + 1$$

$$L_{PA6HIA} = 1/P_{AB} = (I_{AA}/2I_{AB}) + 1$$

where
$P_{BA}$ represents the probability of finding a hexamethylenediamine followed by an adipic acid ($P_{BA} = [BA]/([BB]+[BA])$),
$P_{AB}$ represents the probability of finding a hexamethylenediamine followed by a hydroxyisophthalic acid ($P_{BA} = [AB]/([AA]+[AB])$), and
I represents the intensities of the NMR signal.
NMR: GTA/GTC Measurement when the Standard Measurement is Unusable The NMR was performed in a deuterated solvent for dissolving the PA6HIA (in this instance DCOOC). The characteristic proton chemical shifts of the following units were then integrated:
  (1H) chain end HIA unit: int C
  (2H) chain end amine unit (HMD): int D
  (1H) free HIA (determined via addition): int E
then: $N_{HIAend}$=int C; $N_{HIAfree}$=int E; $N_{HMDend}$=(intD)/2

Next, the GTA and GTC are calculated according to the following relationships:

$$GTA=(2\,000\,000/Mn)/[1+(N_{HIAend}+2\times NHIA_{free})/N_{HMDend}]$$

$$GTC=(2\,000\,000/Mn)-GTA$$

The compounds used are as follows:

PA66 has an Mn of 10 500 and an Mw of 35 000. It has a GTA of 105 meq./kg and a GTC of 32.7 meq./kg.

PA6HIA has an Mn of 6500 and an Mw of 13 800. It has a GTC of 385 meq./kg and a GTC of 47 meq./kg.

The sodium hypophosphite is 99% pure and comes from Aldrich.

PA66 and PA6HIA granules with a water content (Karl Fischer) ranging from 300 to 400 ppm were used.

The devices used are as follows:

The extruder used is a Leistritz extruder comprising two co-rotating screws 34 mm in diameter and a length/diameter ratio L/D of 35. The sheath is composed of 8 zones of controlled temperature and the temperature was adjusted with a gradient ranging from 285° C. in the first zone up to 305° C. in the final zone, reaching a temperature in the melt of 308° C.

The screw profile, the spin speed and the output were adjusted so as to have the residence time necessary for the polycondensation reaction (3 minutes). The material exiting the extruder is drawn in the form of a rod and rapidly cooled in water so as to obtain a solidified rod. It is then formed into granules.

Procedure

A mixture of PA66 granules and of PA6HIA granules with a 90/10 weight ratio and of sodium hypophosphite, 100 ppm by weight relative to the total weight of the composition, is introduced into the extruder, the temperature of which was adjusted with a gradient ranging from 285° C. in the first zone to 305° C. in the final zone, reaching a temperature in the melt of 308° C. After a period of stabilization of the extruder, estimated at 20-30 minutes, the material exiting the extruder is drawn in the form of a rod and rapidly cooled in water so as to obtain a solidified rod. It is then formed into granules in order to be used. The residence time of the polymers in the extruder was about 200 seconds, obtained in this instance via two passes through the extruder (each pass lasting 100 seconds).

This leads to the copolyamide 90/10 PA66/6HIA having the following characteristics:

Tc=220.4° C.; ΔHc=42.9 J/g; Tm=255° C.; ΔHm=42.9 J/g; $Xc_{[PA66]}$=33%

Mn=14 800 g/mol; Mw=67 500 g/mol; Mz=126 500 g/mol; dispersity (Mw/Mn)=4.5

Mean length of the PA66 blocks about 46 repeating units; mean length of the PA6HIA blocks about 5.11 repeating units Moreover, the block copolymer has the same spherulite structure (observation by cross-polarized light microscopy PLM) and lamellar structure (observation by transmission electron microscopy, TEM) as that of PA66.

In addition, this copolymer has a viscosity η at a low shear rate (<200 $s^{-1}$) of about 10 times higher than that of PA66. On the other hand, at a high shear rate (>2000 $s^{-1}$), the viscosity η of this copolymer is comparable to that of PA66 (about twice as high).

Comparative Example 1

PA66

This example repeats the conditions of Example 1, but uses a mixture with a PA66/PA6HIA weight ratio of 100/0, i.e. only PA66.

This leads to the polyamide PA66 having the following characteristics:

Tc=216.2° C.; ΔHc=42.9 J/g; Tm=255° C., ΔHm=55.1 J/g; $Xc_{[PA66]}$=33%

Mn=10 500 g/mol; Mw=35 000 g/mol; Mz=44 500 g/mol; dispersity (Mw/Mn)=3.3

Mean length of the PA66 blocks of about 64.1 repeating units.

Example 2

Copolyamide PA66/6HIA 83/17

This example repeats the conditions of Example 1, but uses a PA66/PA6HIA weight ratio of 83/17.

This leads to the copolyamide 83/17 PA66/6HIA having the following characteristics:

Tc=220.4° C.; ΔHc=42.9 J/g; Tm=255° C.; ΔHm=42.9 J/g; $Xc_{[PA66]}$=33.8%

Mn=15 900 g/mol; Mw=57 000 g/mol; Mz=107 000 g/mol; dispersity (Mw/Mn)=3.5

Mean length of the PA66 blocks about 27.2 repeating units; mean length of the PA6HIA blocks about 4.47 repeating units Moreover, this block copolymer has the same spherulite structure (observation by cross-polarized light microscopy PLM) and lamellar structure (observation by transmission electron microscopy, TEM) as that of PA66.

In addition, this copolymer has a viscosity η at a low shear rate (<200 $s^{-1}$) of about 10 times higher than that of PA66. On the other hand, at a high shear rate (>2000 $s^{-1}$), the viscosity η of this copolymer is comparable to that of PA66 (about twice as high).

Example 3

Charpy Impact Strength

Injected specimens of dimensions 4*10*80 $mm^3$ are first dried overnight under vacuum at 110° C. and are then notched at mid-length to a depth of 2 mm with a V-shaped notch having a radius of 0.1 mm at the base of the notch. The Charpy impact strength is then evaluated using an impact machine, which gives the energy value necessary to break the specimen relative to the surface area under the notch (impact strength R expressed in kJ/$m^2$). The impact machine is equipped with a hammer with an energy of 7.5 J and the impact speed is 1 m/s. A measurement reproducibility on 10 samples is performed. Characterization of the impact strength is performed in a laboratory of temperature regulated to 23° C. and of hygrometry at RH50.

The tests were repeated 5 times for each stress level at 25° C. so as to obtain a statistic.

|  | PA66 (Comp. Ex. 1) | 90/10 PA66/6HIA (Ex. 1) | 83/17 PA66/6HIA (Ex. 2) |
| --- | --- | --- | --- |
| Charpy impact (kJ/$m^2$) | 3.33 | 4.3 | 4.4 |
| Variation | — | +30% | +31% |

Example 4

Permeability

Injected discs with a starting thickness of 3 mm are first thinned by machining until a thickness of 300 μm is reached.

The samples are then dried overnight under vacuum at 110° C. The permeability to ethanol is then measured: one of the faces of the 300 μm film is placed in contact with anhydrous ethanol using leaktight-sealed aluminum permeation crucibles, the other face being in contact with the ambient air. The mass of the assembly (crucible+film+ethanol) is measured over time. After a certain time called the induction time, a loss of mass corresponding to ethanol permeation through the polymer film is measured, and a permeability value representing this loss of mass related to time, at the film surface in contact with the ambient air, and multiplied by the film thickness may be established (permeability P expressed in g·mm/m²·day). A measurement reproducibility on 3 samples is performed. The permeability is measured at 40° C. by placing the permeation crucibles in ventilated heat-controlled ovens at 40° C. The ventilated ovens are located in a room regulated at 23° C. at RH50, so the degree of hygrometry in the oven at 40° C. is 20%.

|  | PA66 (Comp. Ex. 1) | 90/10 PA66/6HIA (Ex. 1) | 83/17 PA66/6HIA (Ex. 2) |
| --- | --- | --- | --- |
| Ethanol permeability 40° C. (g · mm/m² · day) | 5 | 3 | 2.2 |
| Decrease in permeability | — | +60% | +127% |

Example 5

Fatigue

The fatigue tests are run under a stress regime in sinusoidal waveform tension-tension mode at a frequency of 5 Hz, the ratio of the minimum stress to the maximum stress being R=0.1. All the tests were performed in a heat chamber under an atmosphere of air.

The machine used for the mechanical tests is an Instron 8872 servohydraulic machine, capable of performing tests for polyamides with a frequency from 1 to 10 Hz approximately.

The specimens used are ISO527 tensile specimens 4 mm thick, into which, in order to concentrate the stresses, a hole 1 mm in diameter has been made at the center of the specimen, and these specimens were then dried overnight under vacuum at 110° C.

The measurements are given in the following table.

| Fatigue lifetime | PA66 (Comp. Ex. 1) | 90/10 PA66/6HIA (Ex. 1) | 83/17 PA66/6HIA (Ex. 2) |
| --- | --- | --- | --- |
| 65 MPa 23° C. (N) | 2754 | 10964 | 12022 |
| Improvement | — | +298% | +336% |
| 45 MPa 23° C. (N) | 323593 | 1288249 | 1445439 |
| Improvement | — | +298% | +346% |

The invention claimed is:

1. A process for the melt preparation of a copolyamide comprising at least one aliphatic block originating from an aliphatic polyamide and at least one semi-aromatic block originating from a semi-aromatic polyamide, said process comprising:
   mixing at least one aliphatic polyamide and at least one semi-aromatic polyamide,
   wherein the semi-aromatic polyamide comprises repeating units originating from at least one aromatic diacid comprising a hydroxy and/or sulfonate function or repeating units originating from at least one aromatic diamine comprising a hydroxy and/or sulfonate function, said polyamides being terminated with functions that are capable of reacting together,
   heating the mixture so that the polyamides are molten and a polycondensation reaction can take place between the polyamides,
   recovering the copolyamide comprising the at least one aliphatic block and the at least one semi-aromatic block.

2. The process according to claim 1, wherein the the polycondensation reaction takes place during extrusion.

3. The process according to claim 1, wherein the duration of the polycondensation step is less than 30 minutes.

4. The process according to claim 1, wherein the temperature at which the polycondensation step is performed ranges from the highest melting point to the highest melting point plus 80° C.

5. The process according to claim 1, wherein the mixture comprises a polycondensation catalyst.

6. The process according to claim 1, wherein the aliphatic polyamide comprises at least one repeating unit originating from an aliphatic diamine $H_2N-R_1-NH_2$ in which $R_1$ is an aliphatic radical comprising at least 2 carbon atoms.

7. The process according to claim 1, wherein the aliphatic polyamide comprises at least one repeating unit originating from an aliphatic diacid $HOOC-R_2-COOH$ in which $R_2$ is an aliphatic radical comprising at least 2 carbon atoms.

8. The process according to claim 1, wherein the aliphatic polyamide comprises repeating units originating from aliphatic amino acids.

9. The process according to claim 1, wherein when the aliphatic polyamides have a GTC>GTA, the semi-aromatic polyamides have a GTA>GTC, or vice versa.

10. The process according to claim 1, wherein the semi-aromatic polyamide comprises repeating units originating from 2-hydroxyterephthalic acid, 5-hydroxyisophthalic acid, 4-hydroxyisophthalic acid, 2,5-dihydroxyterephthalic acid, sodium 5-sulfoisophthalic, lithium 5-sulfoisophthalic acid, or potassium 5-sulfoisophthalic acid.

11. A semi-crystalline block copolyamide comprising at least one aliphatic block and at least one semi-aromatic block obtained via the process according to claim 1.

12. The block copolyamide according to claim 11, wherein the aliphatic block comprises repeating units originating from aliphatic diamines, aliphatic diacids and/or aliphatic amino acids, and/or the semi-aromatic block comprises repeating units originating from at least one aromatic diacid or at least one aromatic diamine.

13. The block copolyamide according to claim 11, wherein the aliphatic polyamide blocks comprise on average at least 8 repeating units and/or the semi-aromatic polyamide blocks have a mean size of greater than or equal to 3 repeating units.

14. A composition comprising at least one copolyamide according to claim 11.

15. A granule comprising at least one copolyamide according claim 11.

16. A process for manufacturing an article, the process comprising molding a composition according to claim 14.

17. An agent for increasing the difference in viscosity η of a polymer composition measured as a function of shear rate, an agent for improving the impact strength of a polymer composition, an agent for improving the impermeability of a polymer composition, and/or an agent for improving the fatigue life of a polymer composition comprising the block copolymer according to claim 11.

\* \* \* \* \*